United States Patent
Knepper et al.

(10) Patent No.: US 7,603,353 B2
(45) Date of Patent: *Oct. 13, 2009

(54) METHOD FOR RE-RANKING DOCUMENTS RETRIEVED FROM A MULTI-LINGUAL DOCUMENT DATABASE

(75) Inventors: Margaret M. Knepper, Melbourne, FL (US); Kevin Lee Fox, Palm Bay, FL (US); Ophir Frieder, Chicago, IL (US)

(73) Assignee: Harris Corporation, Melbourne, FL (US)

( * ) Notice: Subject to any disclaimer, the term of this patent is extended or adjusted under 35 U.S.C. 154(b) by 93 days.

This patent is subject to a terminal disclaimer.

(21) Appl. No.: 11/279,473

(22) Filed: Apr. 12, 2006

(65) Prior Publication Data
US 2006/0173839 A1    Aug. 3, 2006

Related U.S. Application Data

(63) Continuation-in-part of application No. 10/974,304, filed on Oct. 27, 2004.

(51) Int. Cl.
*G06F 7/00* (2006.01)
(52) U.S. Cl. .............................................. 707/7; 707/5
(58) Field of Classification Search ................. 707/1–10
See application file for complete search history.

(56) References Cited

U.S. PATENT DOCUMENTS

| | | | |
|---|---|---|---|
| 5,987,457 A * | 11/1999 | Ballard | 707/5 |
| 6,208,988 B1 * | 3/2001 | Schultz | 707/5 |
| 6,370,498 B1 * | 4/2002 | Flores et al. | 704/3 |
| 6,574,632 B2 | 6/2003 | Fox et al. | 707/102 |
| 6,701,318 B2 | 3/2004 | Fox et al. | 707/10 |
| 6,711,585 B1 * | 3/2004 | Copperman et al. | 707/104.1 |
| 6,801,906 B1 * | 10/2004 | Bates et al. | 707/3 |
| 7,003,513 B2 * | 2/2006 | Geiselhart | 707/5 |
| 7,188,106 B2 * | 3/2007 | Dwork et al. | 707/5 |
| 2002/0069190 A1 * | 6/2002 | Geiselhart | 707/1 |
| 2004/0186778 A1 * | 9/2004 | Margiloff et al. | 705/14 |
| 2005/0216434 A1 * | 9/2005 | Haveliwala et al. | 707/1 |

OTHER PUBLICATIONS

Vivisimo Clustering Engine, Product Information, 2004, available at www.vivisimo.com.
User-Guided Search Refining in Google, Oct. 6, 2004, available at www.researchbuzz.org.

* cited by examiner

*Primary Examiner*—Wilson Lee
(74) *Attorney, Agent, or Firm*—Allen, Dyer, Doppelt, Milbrath & Gilchrist, P.A.

(57) ABSTRACT

A computer-implemented method for processing documents in a multi-lingual document database includes generating an initial ranking of retrieved multi-lingual documents using an information retrieval system and based upon a user search query, and processing vocabulary words based upon occurrences thereof in at least some of the retrieved multi-lingual documents. Respective relevancies of the vocabulary words based on the occurrences thereof and the user search query are generated. A re-ranking of the retrieved multi-lingual documents is generated based on the relevancies of the vocabulary words.

30 Claims, 14 Drawing Sheets

INFORMATION RETRIEVAL

SELECT DOMAIN VOCABULARY → DETAILS

VOCABULARY:
○ USE EXISTING VOCABULARY
● START A NEW VOCABULARY — 42

RETURN [100] DOCUMENTS — 48

AIRE QUERY
CHECK THE FIELDS YOU ARE INTERESTED IN QUERYING AND FILL IN THE FOLLOWING INFORMATION IN ORDER TO QUERY THE AIRE SYSTEM.

QUERY TERMS →

☑ TITLE: PIRACY — 40
☐ NUMBER: 367
☐ DESCRIPTION: WHAT MODERN INSTANCES HAVE THERE BEEN OF OLD FASHIONED PIRACY, THE BOARDING OR TAKING CONTROL OF BOATS? — 44

☐ NARRATIVE: DOCUMENTS DISCUSSING PIRACY ON ANY BODY OF WATER ARE RELEVANT. DOCUMENTS DISCUSSING LEGAL TAKING OF SHIPS OR THEIR CONTENTS BY A NATIONAL AUTHORITY ARE NON-RELEVANT. CLASHES BETWEEN FISHING VESSELS OVER FISHING ARE NOT RELEVANT UNLESS ONE VESSEL IS BOARDED. — 46

[SEARCH]

| WORD | USED | DOCS | WORD/DOC | RELEVANT | IRRELEVANT | RELEVANCY |
|---|---|---|---|---|---|---|
| PIRACIES | 409 | 103 | 3.97 | 1 | 0 | 1.00 |
| CHINA | 333 | 41 | 8.12 | 1 | 0 | 1.00 |
| COPYRIGHT | 321 | 54 | 5.94 | 1 | 0 | 1.00 |
| SOFTWARE | 318 | 37 | 8.59 | 1 | 0 | 1.00 |
| PIRATE | 300 | 56 | 5.36 | 1 | 0 | 1.00 |
| ILLEGAL | 126 | 37 | 3.41 | 1 | 0 | 1.00 |
| DISC | 103 | 21 | 4.90 | 1 | 0 | 1.00 |
| INTELLECTUAL | 97 | 35 | 2.77 | 1 | 0 | 1.00 |
| INTELLECTUAL_PROPERTIES | 80 | 31 | 2.58 | 1 | 0 | 1.00 |
| COUNTERFEIT | 64 | 19 | 3.37 | 1 | 0 | 1.00 |
| COPYRIGHT_LAW | 62 | 30 | 2.67 | 1 | 0 | 1.00 |
| SHIP | 53 | 20 | 2.65 | 1 | 0 | 1.00 |
| COMPUT_SOFTWARE | 39 | 28 | 1.39 | 1 | 0 | 1.00 |
| ANC | 40 | 27 | 1.48 | 1 | 0 | 1.00 |
| SOFTWARE_PIRACIES | 32 | 20 | 1.60 | 1 | 0 | 1.00 |
| COMPACT_DISC | 31 | 18 | 1.72 | 1 | 0 | 1.00 |
| VESSEL | 27 | 9 | 3.00 | 1 | 0 | 1.00 |
| MARITIME | 21 | 11 | 1.90 | 1 | 0 | 1.00 |
| CHINA_SEA | 19 | 7 | 2.57 | 1 | 0 | 1.00 |
| INTERN_MARITIME | 12 | 9 | 1.33 | 1 | 0 | 1.00 |

FIG. 8

QUERY RESULTS

AIRE | QUERY RESULTS | WORD LIST

SEARCH RESULTS FOR PRIVACY
VOCABULARY USED: PIRACY

PIRACY VOCABULARY RANKING

INFORMATION RETRIEVAL

| VIEW FILE | TITLE | FILE ID | AIRE RELEVANCY | VOCAB RELEVANCY | AIRE+VOCAB RELEVANCY | RELEVANCY | MILDLY RELEVANT | OFF TOPIC | WORD COUNT | COMMENTS |
|---|---|---|---|---|---|---|---|---|---|---|
| | BEIJING TAKES MEASURES ON PIRACY ACTIVITIES | FBIS4-2723 | 5 | 1 | 1 | | | | 354 | |
| | BEIJING CALLS 'PIRACY' ACTS 'JUST', 'LAWFUL' | FBIS3-3196 | 40 | 2 | 2 | ✓ | | | 582 | |
| | PIRACY ATTACKS IN SOUTHEAST ASIA SHOW DECLINE | FBIS3-48230 | 12 | 3 | 3 | ✓ | | | 758 | |
| | CONCERN EXPRESSED OVER PRC ROLE IN PIRACY | FBIS4-33276 | 85 | 4 | | ✓ | | | 75 | |
| | NEWSPAPER REVIEWS LITERARY EFFORTS IN 1993 | FBIS-20590 | 8 | 5 | 28 | | | ✓ | 452 | |
| | EDITORIAL CRITICIZES GOVERNMENT HANDLING OF PIRACY ISSUES | FBIS3-3864 | 18 | 6 | 2 | ✓ | | | 685 | |
| | INTERNATIONAL MARITIME ON 'PIRACY' BY PRC SHIPS | FBIS3-44900 | 43 | 7 | 5 | | | ✓ | 245 | |
| | WORLD TRADE NEWS: PIRATED MUSIC IN SALES OF DOLLARS 2.1 BN | FBIS2-15481 | 45 | 8 | 13 | | | ✓✓ | 658 | |
| | PRC DENIES SECURITY FORCE PIRACY, DRAWS UP NEW GUIDELINES | FBIS3-3863 | 31 | 9 | 16 | ✓ | | ✓ | 457 | |
| | POLICE TARGET PRIVATE SECTOR IN BOOK PIRACY CRACKDOWN | FBIS4-26342 | 22 | 10 | 8 | | | ✓ | 56 | |
| | SIXTIES BUCCANEER DEALS IN HIGH-TECH PIRACY | FBIS4-4966 | 52 | 11 | 20 | | | ✓ | 754 | |
| | INDONESIA DENIES PIRACY LINK IN SHIPS' COLLISION | FT923-1266 | 94 | 12 | 43 | ✓ | | | 114 | |
| | WORLD TRADE NEWS: WORLDWIDE PIRATE DISC SALES DOUBLE TO 75M-CHINA MAINLY TO BLAME | FT942-5998 | 56 | 13 | 21 | | | | 858 | |
| | US PRESSURES CHINA FOR SOFTWARE PIRACY | FT943-10345 | 64 | 14 | 23 | | | | 65 | |
| | MALAYSIA'S DISASTER WARNINGS TO GO UNHEEDED IN STRAIT OF MALACCA: MAERSKA NAVIGATOR COLLISION WAS THE LATEST IN A SERIES OF ACCIDENTS | FT931-13007 | | 15 | | | | | 117 | |
| | PIRACY WARNINGS | FT924-15875 | 9 | 16 | 6 | | | ✓ | 565 | |
| | DENG'S DAUGHTER PURSUES PUBLISHERS OF PIRATED BIOGRAPHY | FBIS4-1621 | 103 | 17 | 50 | | | ✓ | 985 | |
| | PIRATE DECODERS POSE THREAT TO SATELLITE BROADCASTERS | FT934-6142 | 95 | 18 | 46 | | | ✓✓ | 658 | |
| | WORLD TRADE NEWS: US RENEWS PRESSURE ON CHINA OVER INTELLECTUAL PIRACY | FT943-12951 | 88 | 19 | 44 | | | | 266 | |
| | LISTING: CABLE PIRATES; SIMI VALLEY PIRACY CASE IS ONE OF THE FIRST TO RESULT IN A CONVICTION | LA32089-0045 | 38 | 20 | 18 | | | ✓ | 189 | |

FIG. 9

AIRE RANKING + MARITIME VOCABULARY RANKING

INFORMATION RETRIEVAL

QUERY RESULTS

AIRE | QUERY RESULTS | WORD LIST

SEARCH RESULTS FOR PIRACY
VOCABULARY USED: PIRACY

| VIEW FILE | TITLE | FILE ID | AIRE RELEVANCY | VOCAB RELEVANCY | AIRE+VOCAB RELEVANCY | RELEVANCY | MILDLY RELEVANT | OFF TOPIC | WORD COUNT | CHARACTERS |
|---|---|---|---|---|---|---|---|---|---|---|
| | CONCERN EXPRESSED OVER PRC ROLE IN PIRACY | EBIS4-33276 | 2 | 1 | 1 | | | | 538 | |
| | EDITORIAL CRITICIZES GOVERNMENT HANDLING OF PIRACY ISSUE | EBIS3-3864 | 8 | 4 | 2 | | | | 354 | |
| | PIRACY ATTACKS IN SOUTHEAST ASIA SHOW DECLINE | EBIS3-48230 | 12 | 3 | 3 | ✓ | | | 245 | |
| | BEIJING TAKES MEASURES ON PIRACY ACTIVITIES | EBIS4-2223 | 15 | 7 | 4 | ✓ | | | 611 | |
| | PIRACY WARNINGS | FT924-15875 | 18 | 16 | 5 | ✓ | | | 764 | |
| | INTERNATIONAL MARITIME ON "PIRACY" BY PRC SHIPS | EBIS3-44900 | 9 | 11 | 6 | ✓ | | | 542 | |
| | WORLD TRADE NEWS: CODED WARNING TO PIRATES- PLANS TO CURB COUNTERFEIT OS | FT941-774 | 29 | 10 | 7 | | ✓ | | 82 | |
| | OFFICIAL URGES FOREIGNERS TO JOIN COPYRIGHT PROTECTION | EBIS4-26215 | 31 | 2 | 8 | | | ✓ | 115 | |
| | EASTERN CARIBBEAN ISLANDS BECOMING "PREFERRED AREA" FOR | EBIS4-67139 | 40 | 33 | 9 | | | ✓ | 45 | |
| | BEIJING CALLS "PIRACY ACTS" JUST "LAWFUL" | EBIS3-3196 | 11 | 27 | 10 | | ✓ | | 563 | |
| | ASSOCIATION FORMED TO PROTECT IPR | EBIS4-26214 | 19 | 36 | 11 | | | | 566 | |
| | TOUGHER RESTRICTIONS ON SOFTWARE DUPLICATION HINDERS PIRACY | FT943-17085 | 10 | 8 | 12 | | ✓ | | 258 | |
| | COPYRIGHT OFFICIAL VIEWS IPR PROTECTION | EBIS4-26750 | 43 | 35 | 13 | ✓ | | | 746 | |
| | SOFTWARE COMPANIES OFFER REWARDS IN ANTI-PIRACY DRIVE | FT944-16684 | 13 | 28 | 14 | | ✓ | ✓ | 125 | |
| | PRC DENIES SECURITY FORCE PIRACY, DRAWS UP NEW GUIDELINES | EBIS3-3863 | 22 | 9 | 15 | ✓ | | ✓ | 475 | |
| | TAIWAN BOOSTS COPYRIGHTS | FT922-6363 | 45 | 29 | 16 | | | ✓ | 356 | |
| | INDONESIA DENIES PIRACY LINK IN SHIPS COLLISION | FT923-1266 | 27 | 12 | 17 | | ✓ | | 457 | |
| | SURVEY OF PERSONAL AND PORTABLE COMPUTERS(21): TOUGHER TIMES FOR PIRATES/ A LOOK AT NETWORKS' HIDDEN BENEFITS | FT931-8281 | 38 | 20 | 18 | | | | 56 | |
| | WORLD TRADE NEWS: US FURY OVER PIRACY BY TAIWANESE | FT932-17442 | 34 | 26 | 19 | | | ✓ | 785 | |
| | SOFTWARE COMPANIES CRACK DOWN ON THEFT AND PIRACY | FT911-3757 | 52 | 12 | 20 | | | ✓ | 235 | |

1 = AIRE Ranking
2 = AIRE Ranking + Piracy Vocabulary Ranking
3 = AIRE Ranking + Piracy Vocabulary Ranking using identification of irrelevant words
4 = AIRE Ranking + Maritime Vocabulary Ranking using identification of irrelevant words
5 = Maritime vocabulary Ranking using identification of irrelevant words

METHOD FOR RE-RANKING DOCUMENTS RETRIEVED FROM A MULTI-LINGUAL DOCUMENT DATABASE

RELATED APPLICATION

This application is a continuation-in-part of U.S. patent application Ser. No. 10/974,304 filed Oct. 27, 2004, the entire contents of which are incorporated herein by reference.

FIELD OF THE INVENTION

The present invention relates to the field of information retrieval, and more particularly, to a method of information retrieval that enhances identification of relevant documents retrieved from a multi-lingual document database.

BACKGROUND OF THE INVENTION

Information retrieval systems and associated methods search and retrieve information in response to user search queries. As a result of any given search, vast amounts of data may be retrieved. These data may include structured and unstructured data, free text, tagged data, metadata, audio imagery, and motion imagery (video), for example. To compound the problem, information retrieval systems are searching larger volumes of information every year. A study conducted by the University of California at Berkley concluded that the production of new information has nearly doubled between 1999 and 2002.

When an information retrieval system performs a search in response to a user search query, the user may be overwhelmed with the results. For example, a typical search provides the user with hundreds and even thousands of items. The retrieved information includes both relevant and irrelevant information. The user now has the burden of determining the relevant information from the irrelevant information.

One approach to this problem is to build a taxonomy. A taxonomy is an orderly classification scheme of dividing a broad topic into a number of predefined categories, with the categories being divided into sub-categories. This allows a user to navigate through the available data to find relevant information while at the same time limiting the documents to be searched. However, creating a taxonomy and identifying the documents with the correct classification is very time consuming. Moreover, a taxonomy requires continued maintenance to categorize new information as it becomes available.

Another approach is to use an information retrieval system that groups the results to assist the user. For example, the Vivisimo Clustering Engine™ automatically organizes search results into meaningful hierarchical folders on-the-fly. As the information is retrieved, it is clustered into categories that are intelligently selected from the words and phrases contained in the search results themselves. This results in the categories being up-to-date and fresh as the contents therein.

Visual navigational search approaches are provided in U.S. Pat. Nos. 6,574,632 and 6,701,318 to Fox et al., the contents of which are hereby incorporated herein by reference. Fox et al. discloses an information retrieval and visualization system utilizing multiple search engines for retrieving documents from a document database based upon user input queries. Each search engine produces a common mathematical representation of each retrieved document. The retrieved documents are then combined and ranked. A mathematical representation for each respective document is mapped onto a display. Information displayed includes a three-dimensional display of keywords from the user input query. The three-dimensional visualization capability based upon the mathematical representation of information within the information retrieval and visualization system provides users with an intuitive understanding, with relevance feedback/query refinement techniques that can be better utilized, resulting in higher retrieval accuracy.

Despite the continuing development of search engines and result visualization techniques, there is still a need to quickly and efficiently search large document collections and present the results in a meaningful manner to the user.

This is particularly true when analyzing multi-lingual documents. For instance, analysts typically operate in a time critical environment that is both multicultural and multi-lingual. The volumes of data that need to be analyzed are growing at ever increasing rates. Analysts generally lack the time and many lack the capability to analyze multi-lingual data. Consequently, there is also a need to quickly and efficiently search large document collections containing multi-lingual information and present the results in a meaningful manner to the user.

SUMMARY OF THE INVENTION

In view of the foregoing background, it is therefore an object of the present invention to assist a user in identifying relevant documents containing multi-lingual information and discarding irrelevant documents after the documents have been retrieved using an information retrieval system.

This and other objects, features, and advantages in accordance with the present invention are provided by a computer-implemented method for processing documents in a document database comprising generating an initial ranking of retrieved multi-lingual documents using an information retrieval system and based upon a user search query, generating a plurality of vocabulary words based upon occurrences thereof in at least some of the retrieved multi-lingual documents, and generating respective relevancies of the vocabulary words based on the occurrences thereof and the user search query. A re-ranking of the retrieved multi-lingual documents based on the relevancies of the vocabulary words is generated. The computer-implemented method in accordance with the present invention advantageously allows a user to identify relevant documents and discard irrelevant documents after the multi-lingual documents have been retrieved using the information retrieval system.

The multi-lingual documents may comprise at least one document having multiple languages and/or different documents with different languages. The user search query may comprise a multi-lingual user search query. Alternatively, the user search query may be translated into a multi-lingual user search query before generating the initial ranking of the retrieved multi-lingual documents.

The computer-implemented method may further comprise generating the plurality of vocabulary words based upon occurrences thereof in at least some of the retrieved multi-lingual documents before the processing. In this embodiment, the vocabulary words are provided by the words in the retrieved multi-lingual documents.

Alternatively, a user may select a vocabulary comprising the plurality of vocabulary words before the processing, with the vocabulary words corresponding to the user search topic. In this embodiment, the vocabulary words may be based upon words in at least one predetermined document, and the predetermined document does not need to be part of the retrieved multi-lingual documents. In addition, vocabulary words may be added to the vocabulary based upon occurrences of words in at least some of the retrieved multi-lingual documents. A quality of the vocabulary may be determined based upon how many vocabulary words are added thereto.

The computer-implemented method may further comprise selecting N top ranked documents from the retrieved multi-lingual documents before processing the plurality of vocabulary words, with N being an integer greater than 1. Generating the respective relevancies and generating the re-ranking are with respect to the N top-ranked documents.

Generating the respective relevancies of the vocabulary words may comprise counting how many times a respective vocabulary word is used in the N top ranked documents, and counting how many of the N top ranked documents uses the respective vocabulary word. A word/document ratio for each respective vocabulary word may be generated based upon the counting, and if the word/document ratio is less than a threshold, then the relevancy of the word is not used when generating the re-ranking of the N top ranked documents.

The computer-implemented method may further comprise determining which documents from at least some of the retrieved multi-lingual documents are relevant to the user search query, and generating the re-ranking of the retrieved multi-lingual documents may also be based on the relevant documents. A determination may be made if the respective vocabulary words are relevant to the user search query, and then a determination may be made as to whether the documents are relevant based upon the relevant vocabulary words.

The computer-implemented method may further comprise determining a respective source of at least some of the retrieved multi-lingual documents, and assigning priority to documents provided by preferred sources. Generating the re-ranking of the retrieved multi-lingual documents may also be based on documents with preferred sources. A second re-ranking of the retrieved multi-lingual documents based upon a combination of the initial ranking and the re-ranking of the retrieved multi-lingual documents may be generated. The re-ranked documents may also be displayed.

Another aspect of the present invention is directed to a computer-readable medium having stored thereon a data structure for processing documents in a multi-lingual document database as defined above. Yet another aspect of the present invention is directed to a computer implemented system for processing documents in a multi-lingual document database as also defined above.

BRIEF DESCRIPTION OF THE DRAWINGS

FIG. 2 is an initial query display screen in accordance with the present invention.

FIGS. 5 and 6 are display screens illustrating the word lists from a selected document in accordance with the present invention.

FIGS. 8-11 are display screens illustrating the document rankings for different ranking parameters in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
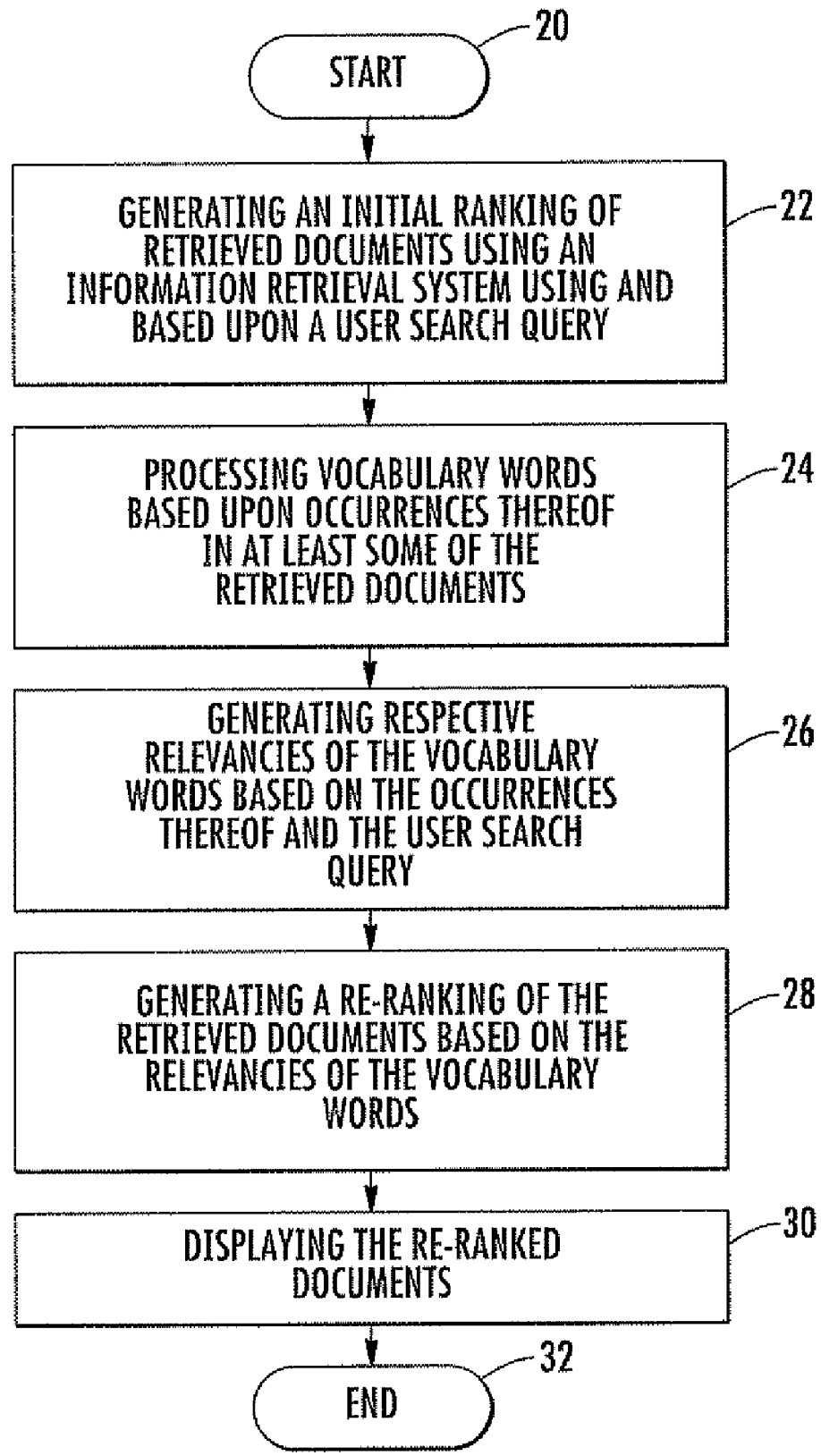
FIG. 1 is a flowchart for processing documents in a document database in accordance with the present invention.

Referring initially to FIG. 1, the present invention is directed to a computer-implemented method for processing documents in a document database. The document database may also include multi-lingual documents. From the start (Block 20), the method comprises generating an initial ranking of retrieved documents using an information retrieval system and based upon a user search query at Block 22. A plurality of vocabulary words based upon occurrences thereof in at least some of the retrieved documents is generated at Block 24, and respective relevancies of the vocabulary words based on the occurrences thereof and the user search query is generated at Block 26. A re-ranking of the retrieved documents based on the relevancies of the vocabulary words is generated at Block 28. The method further comprises displaying the retrieved documents after having been re-ranked at Block 30. The method ends at Block 32.

The computer-implemented method for processing documents in a document database advantageously allows a user to identify relevant documents and discard irrelevant documents after the documents have been retrieved using an information retrieval system. The user may be a human user or a computer-implemented user. When the user is computer-implemented, identifying relevant documents and discarding irrelevant documents is autonomous. The information retrieval system includes an input interface for receiving the user search query, and a search engine for selectively retrieving documents from a document database.

The search engine is not limited to any particular search engine. An example search engine is the Advanced Information Retrieval Engine (AIRE) developed at the Information Retrieval Laboratory of the Illinois Institute of Technology (IIT). AIRE is a portable information retrieval engine written in Java, and provides a foundation for exploring new information retrieval techniques. AIRE is regularly used in the Text Retrieval Conference (TREC) held each year, which is a workshop series that encourages research in information retrieval from large text applications by providing a large text collection, uniform scoring procedures, and a forum for organizations interested in comparing their results.

Since TREC uses a dataset with known results, this facilities evaluation of the present invention. An example search topic from TREC is "piracy," which is used for illustrating and evaluating the present invention. AIRE provides the initial ranking of the retrieved documents based upon the "piracy" user search query. The number and/or order of the relevant documents in the initial ranking is the baseline or reference that will be compared to the number of relevant documents in the re-ranked documents.

As will be discussed in further detail below, there are a variety of word and document relevancy options available to the user. Individually or in combination, these options improve the retrieval accuracy of a user search query. Implementation of the present invention is in the form of an algorithm requiring user input, and this input is provided via the graphical user interface (GUI) associated with AIRS.

The initial AIRE query screen for assisting a user for providing the relevant feedback for re-ranking the retrieved documents is provided in FIG. 2. The "piracy" user search query is provided in section 40, and the user has the option in section 42 of starting a new vocabulary or using an existing vocabulary. In this case, a new vocabulary is being started.

A description of the topic of interest is provided in section 44, which is directed to "what modern instances have there been of good old-fashioned piracy, the boarding or taking control of boats?" A narrative providing more detailed information about the description is provided in section 46. The narrative in this case states that "documents discussing piracy on any body of water are relevant, documents discussing the legal taking of ships or their contents by a national authority are non-relevant, and clashes between fishing boats over fishing are not relevant unless one vessel is boarded." The words in the description and narrative sections 44, 46 were not included as part of the user search query. Nonetheless, the user has the option of making the words in the description and narrative sections 44, 46 part of the user search query by selecting these sections along with section 40.

Figure 3B:
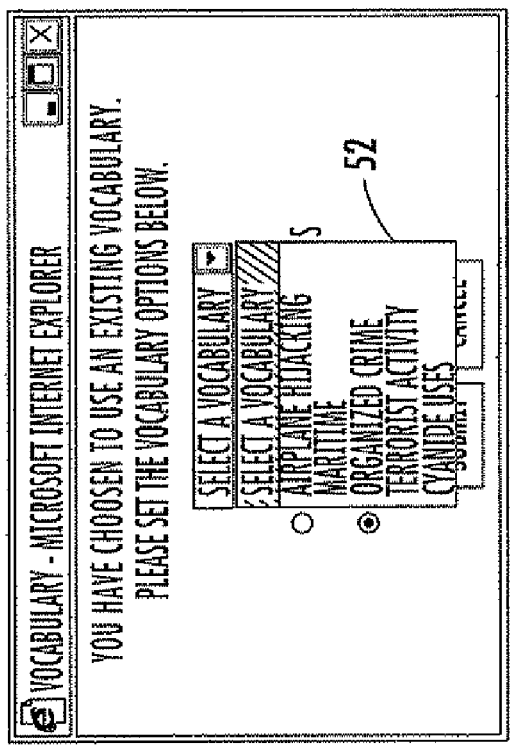
FIGS. 3a and 3b respectively illustrate in accordance with the present invention a display screen for starting a new vocabulary and for using an existing vocabulary.
Figure 3A:
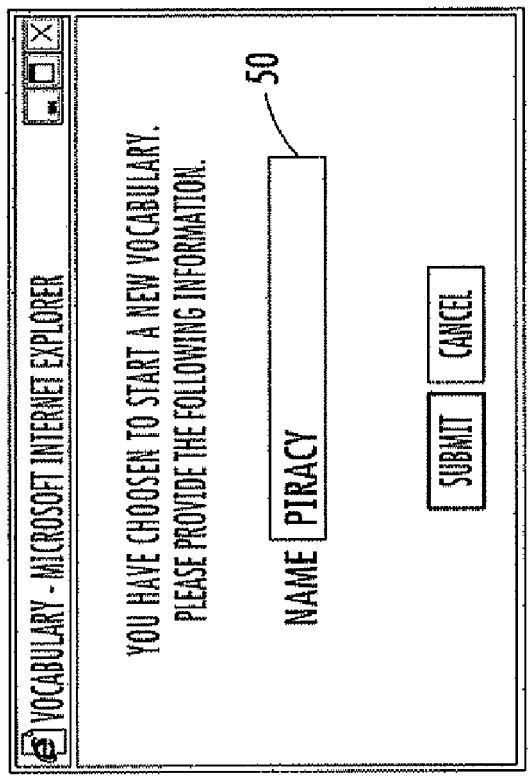

When the user selects starting a new vocabulary in section 42, a new vocabulary screen appears as illustrated in FIG. 5a. Here the user enters a name for the new vocabulary in section 50, which in the illustrated example is "piracy." In this case, the title of the new vocabulary is also the user search query. Alternatively, if the user had selected using an existing vocabulary in section 42, then the existing vocabulary screen appears as illustrated in FIG. 3b. A topic of interest may overlap two different vocabularies so selecting a preferred vocabulary would be helpful. As in the illustrated example, piracy relates to maritime instead of the illegal coping of movies and songs. Consequently, an existing vocabulary, such as "maritime" may be selected in section 52, which already includes relevant words that would be found in the retrieved documents. In fact, the vocabulary words in the existing vocabularies may be taken from the words in preferred documents that are known to be relevant to the user search query. The preferred document may or may not be part of the retrieved documents.

The initial ranking of the retrieved documents is a very large number with respect to "piracy," which includes both relevant and irrelevant documents. Before generating a new vocabulary, the user selects the N top ranked documents in section 48 in FIG. 2. In the illustrated example, the number of top ranked documents to be re-ranked is 100.

To build a new vocabulary, an algorithm counts the number of times words are used throughout the top 100 retrieved documents. The words may be counted at their stemmed version, although this is not absolutely necessary. A domain vocabulary can also be built by providing a list of relevant documents. The information collected for each word in each document is the number of times the word was used in the document, and the number of documents in the top 100 top ranked documents that used the word.

Next, document statistics are calculated for determining how useful each word is to the N top ranked documents. Useless words are not used to calculate information about the document. Useless words are words that do not provide meaning, such as stop words (e.g., am, are, we) or words that act as stop words within the domain (e.g., computer in computer science literature). Statistics used for determining a useless word may include, but are not limited to, the following:

a) word/document ratio=1 (the word needs to appear more than once in a document to be useful);

b) word/document ratio>20 (this determines a meaningful threshold; and a range of thresholds may be used instead of a single threshold); and c) the number of documents=1 (the word needs to appear in more than one document).

Based upon the criteria in a) through c), the vocabulary thus comprises for each useful word the number of times it was used (traditional term frequency only within a single document, the number of documents using the word (traditional document frequency), and the word/document ratio.

After a list of vocabulary words provided by the top 100 ranked documents and the user search query (i.e., "piracy") has been compiled, the relevancy of the vocabulary words are set. Some vocabulary words may be more relevant/irrelevant than other words. Word relevance is set by topic, which in this case is "piracy" as related to "maritime." Relevant words are useful words that describe the topic "piracy." Irrelevant words are words that do not describe the topic, and are an indicator of irrelevant documents.

Relevance is set to a value of 1 for the query terms supplied by the user. The relevance value of a vocabulary word is based upon the number of times the word was relevant and on the number of times the word was irrelevant. The relevancy value of a word can be written as follows: Relevancy Value=(#Rel−#Irrel)/(#Rel+#Irrel). A word can be deemed relevant, for example, if the relevancy value>0.5, and irrelevant if the relevancy value<−0.5. The 0.5 and −0.5 are example values and may be set to other values as readily appreciated by those skilled in the art. In addition, a range of thresholds may be used instead of a single threshold.

To calculate document statistics, information is calculated based on the words in the N top ranked documents. A document comprises a set of words, and a word can appear 1 or more times therein. Each document is essentially unstructured text, and a word can be characterized as new, useless or useful. A new word is new to the vocabulary. In a training session, i.e., starting with a new vocabulary, all the words are in the vocabulary. A useless word is not used in document calculations, and as noted above, these words do not provide meaning. Useless words are stop words, such as am, are, we, or words that act as stop words within the domain, such as computer in computer science literature. A useful word is a word that will be used in the document statistics.

A useful word can be further classified as relevant, irrelevant or neutral. As defined by these classification terms, a relevant word is important to the topic, and an irrelevant word is not useful to the topic and is usually an indicator of a bad document. A neutral word is one in which the status of the word as related to the topic has not been determined.

To calculate the re-ranking of the retrieved documents, an algorithmic approach is used to rate the documents. The algorithmic approach uses the relevancy information discussed above. The output of the initial document ranking by AIRE is a list of the documents rated from 1 to 100, where 100 was selected by the user. The lowest number indicates the best ranking. Alternatively, the highest number could be the best ranking.

Three different relevancy values are used to re-rank the documents. The first relevancy value is based upon following expression:

$$\text{Unique Rel} - \text{Unique Irrel} \rightarrow \text{UniqueRel} \qquad (1)$$

The number of unique relevant words in the document is counted, and the number of irrelevant words in the document is counted. The sum of the irrelevant words is subtracted from the sum of the relevant words. As an observation, this calculation becomes more useful when there are only individual words identified. That is, entire documents have not been identified as relevant/irrelevant.

The second relevancy value is based upon following expression:

$$\text{Rel NO Freq} - \text{Irrel NO Freq} \rightarrow \text{RelNOFreq} \qquad (2)$$

Here the importance of unique relevant/irrelevant words in the document is determined. The sum of the number of times the word is irrelevant in the vocabulary is subtracted from the sum of the number of times the word is relevant in the vocabulary. A word that appears more often in the vocabulary will have a higher weight than words that just appeared a couple of times. As an observation, this value is tightly coupled with the Unique Rel−Irrel value in expression (1), particularly when all the values are positive.

The third relevancy value is based upon following expression:

$$\text{Rel Freq} - \text{Ir Freq} \rightarrow \text{RelFreg} \qquad (3)$$

Here the importance of unique relevant/irrelevant words and their frequency in the documents is determined. The sum of the number of times the word is relevant in the vocabulary is multiplied by the number of times the word is used in the document. The sum of the number of times the word is irrelevant in the vocabulary is multiplied by the number of times the word is used in the document. The irrelevancy frequency sum is subtracted from the relevancy frequency sum. A word that appears more often in the vocabulary will have a higher weight than words that just appeared a couple of times. As an observation, this value is more useful when relevant/irrelevant document examples have been trained in the system.

To identify bad documents there are two techniques. One is based upon the over usage of specific words, and the other is based on a low UniqueRel value as defined in expression (1). With respect to over usage of specific words, documents that have a word appearing more than 100 times, for example, in a document are identified as bad documents. Also, words that are used very frequently in a few documents are determined to have a usefulness set to 0. The user has the option of setting the number of times the word appearing in a document is to be considered as a bad value.

The initial ranking of the N top ranked retrieved documents is re-ranked from the highest relevancy values to the lowest relevancy values for expressions 1) UniqueRel, 2) RelNOFreq and 3) RelFreq. The re-ranking of each document is averaged for the three expressions to obtain the final re-ranking of the retrieved documents. In each of the respective document rankings, bad documents are sent to the bottom of the document list. Two different techniques may be used in moving the bad documents to the bottom. One technique is jumping number ordering—which assigns large values to the document's ranking so that it remains at the bottom. The other technique is smooth number ordering—which assigns continuous ranking numbers to the documents.

With respect to the UniqueRel numbers obtained for the documents, all documents with the smallest UniqueRel number are identified as bad. If the second smallest UniqueRel numbers are under 30%, for example, then these documents are also characterized as bad. Additional small UniqueRel documents can be added until the total number of documents does not exceed 30%. In other words, taking the percentage of the lowest number of UniqueRel from the percentage of the highest number of UniqueRel should not exceed 30%. The user has the option of setting this threshold to a value other than 30%, as readily appreciated by those skilled in the art.

In re-ranking the N top ranked retrieved documents, it is also possible to assign priority to a document based upon the source of the document. For example, National Scientific would carry a greater weight than The National Enquirer.

Management of the data will now be discussed with reference to the user display screens provided in FIGS. 4-7. The data are handled at two levels: vocabulary and topic. The vocabulary is used to define the domain, and includes for each word the number of times used in each document and the number of documents the word appeared. A vocabulary can be used by multiple topics, such as in the form of a predefined vocabulary. However, it is preferable to avoid using the same document to train multiple times. With respect to the managing the data by topic, the relevance/irrelevance of the words and documents are used, as well as using the query search terms.

The majority of the data management deals with the user interface. The user has the ability to view any document and the word information associated therewith. The user has the ability to identify relevant/irrelevant documents and words to use for training, i.e., building the vocabulary. The user has the ability to identify words for a future AIRE query. The user has the ability to run a new AIRE query or re-run the ranking algorithm in accordance with the present invention on the current data based on information supplied to the system.

Figure 4:
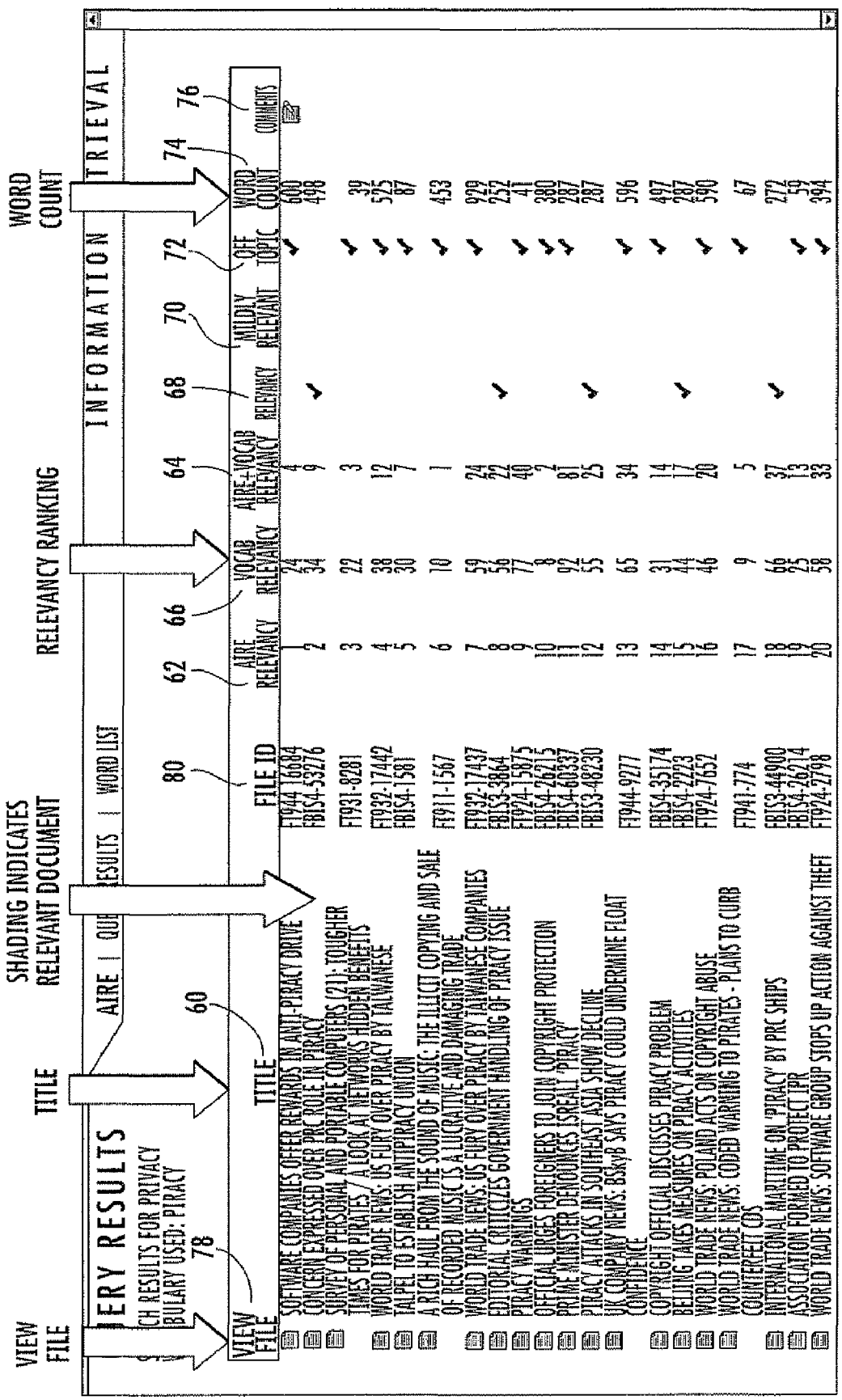
FIG. 4 is a display screen illustrating the query results using the "piracy" vocabulary in accordance with the present invention.

The initial ranking of the retrieved documents using the "piracy" vocabulary is illustrated in FIG. 4. Column 60 lists the titles of the documents in order from high to low. The AIRE relevancy is provided in column 62. After the retrieved documents have been re-ranked while taking into account the "piracy" vocabulary, this re-ranking is averaged with the initial ranking provided by AIRE in column 62. The combination of the two rankings is provided in column 64. For example, the highest ranked document in column 62 is now the sixth ranked document in column 64.

Selecting any one of the listed titles in column 60 will display the document words. The relevancy of each vocabulary word with respect to each document is provided in column 66. For each document, the document may be marked as relevant (column 68), mildly relevant (column 70) or off topic (column 72). In addition, the total word count for each document is provided in column 74, and comments associated with any of the documents may be added or viewed by selecting the icon in column 76.

If the user desires to view the entire document, then the user highlights the icon in column 78 next to the title of interest. The information for each document is stored in a respective file, as indicated by column 80. To further assist the user, when a document is marked as relevant, then the row associated with the relevant document is highlighted.

Figure 5:
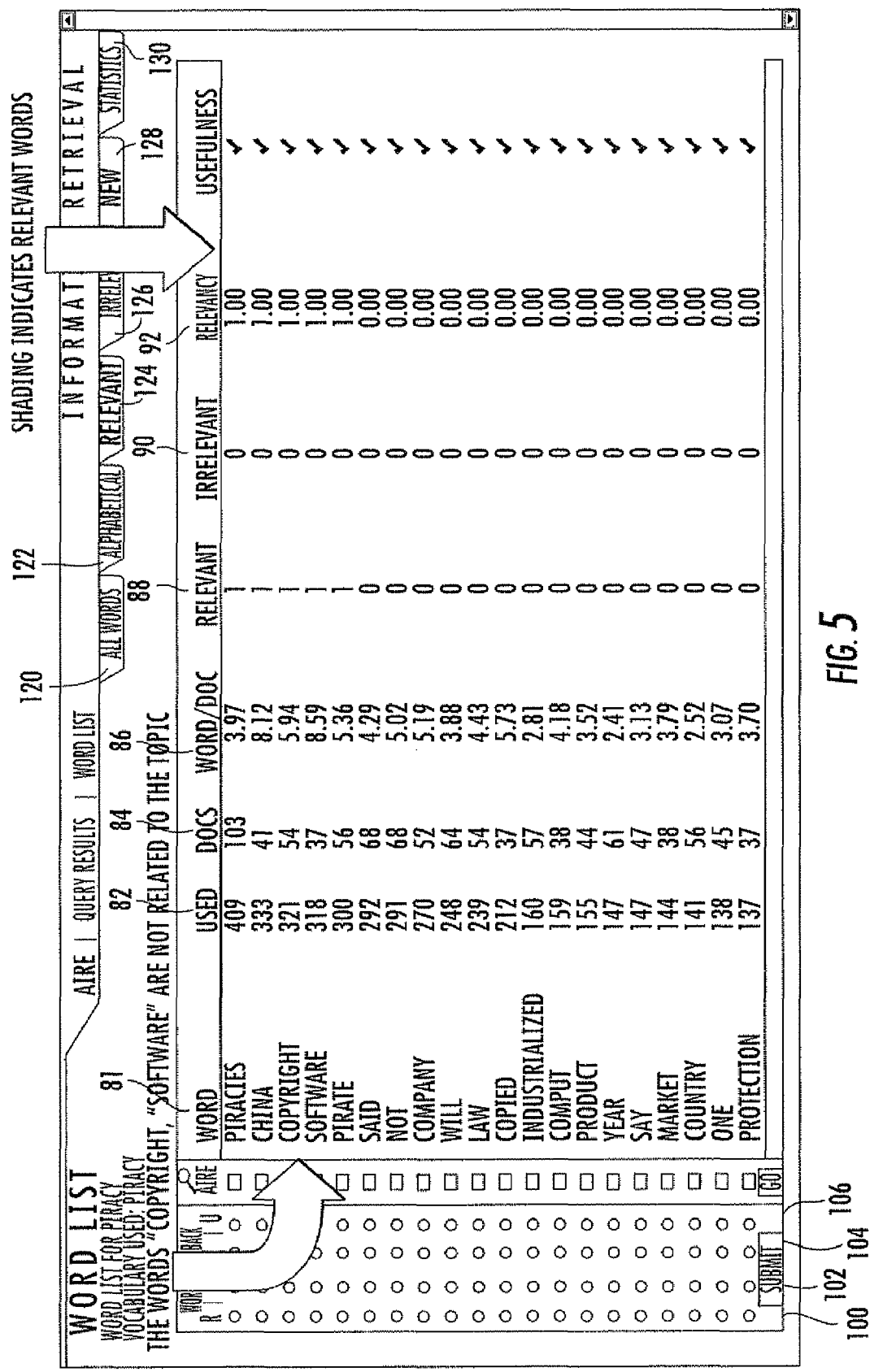

By selecting on the title of a particular document in column 60, the words in that document are displayed in column 81 in an order based upon how many times they are used in the document (FIG. 5). This screen also shows how the words are set in terms of relevancy. The number of times each vocabulary word is used in the document is listed in column 82, and the number of documents that uses the word is listed in column 84. The word/document ratio is provided in column 86. The vocabulary words initially marked by the user as relevant are indicated by the numeral 1 in columns 88 and 92. If the vocabulary word is irrelevant, then the numeral −1 is placed instead in column 90.

The highlighted section in FIG. 5 also indicates the relevant words. However, the words "copyright" and "software" are not related to the topic "piracy." While still in this screen, the user can sort the words by relevancy and usage by selecting the appropriate characterization: R for relevant (column 100), I for irrelevant (column 102), N for neutral (column 104) and U for useless (column 106). If the word is already marked as relevant, then no action is required for that word.

The screen display illustrated in FIG. 6 illustrates the selection of certain vocabulary words via column 102 as irrelevant. An alternative to the display screen in FIGS. 5 and 6 when viewing the words in a particular document is provided in FIG. 7. In this particular screen, the user also has the option of selecting in section 110' whether the document is relevant, mildly relevant or off topic. The user also has the option of adding new words via section 112' to the vocabulary.

Figure 7:
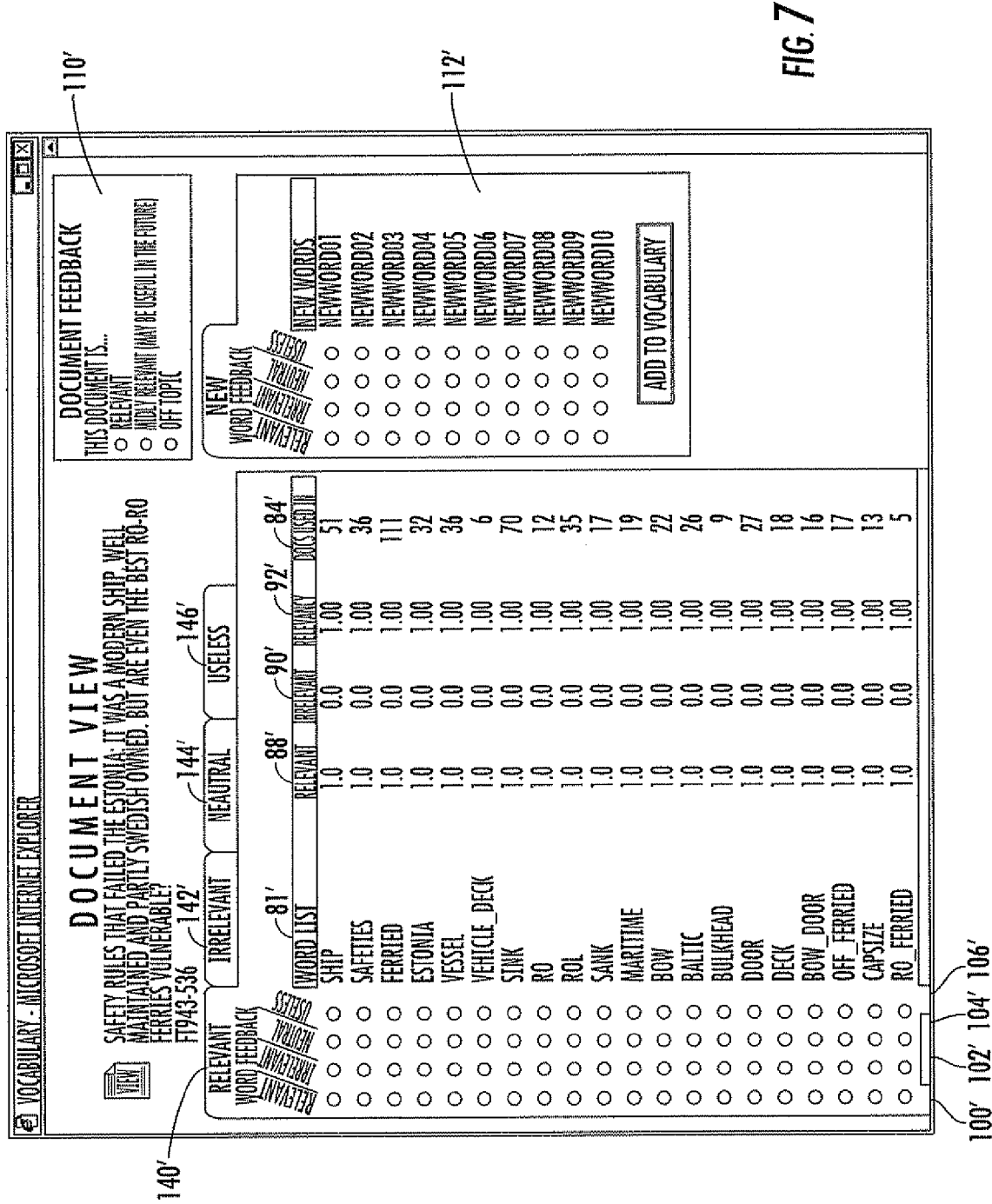
FIG. 7 is a display screen illustrating another version of a word list from a selected document in accordance with the present invention.

The user also has the option of selecting multiple views (as labeled) according to user preference. For instance, tab 120 list all the vocabulary words in a document, tab 122 list the vocabulary words in alphabetical order, tab 124 list the vocabulary words marked as relevant, tab 126 list the vocabulary words marked as irrelevant, tab 128 list the vocabulary words marked as new, and statistics of the vocabulary words may be obtained by selecting tab 130. In FIG. 7, the user has the option of selecting tabs with respect to the relevant/irrelevant/neutral words in the documents. Tab 140' list the relevant words in the documents, tab 142' lists the irrelevant words in the documents, tab 144' list the neutral words in the documents, and tab 146' list the useless words in the documents.

Comparing various document ranking results of the computer-implemented method for processing documents in a document database in accordance with the present invention will now be compared to the baseline results provided by AIRE, that is, the initial ranking of the retrieved documents. The display screens provided in FIGS. 4 and 8-11 will now be referenced. The initial ranking from 1 to 20 (column 62) of the retrieved documents is provided in column 60 as shown in FIG. 4. The document titles corresponding to the "piracy" vocabulary rankings from 1 to 20 (column 66) are listed in column 60 in FIG. 8. A visual comparison can be made between the relationships in the ranked baseline documents versus the ranked documents provided by the most relevant "piracy" vocabulary words.

Figure 9:
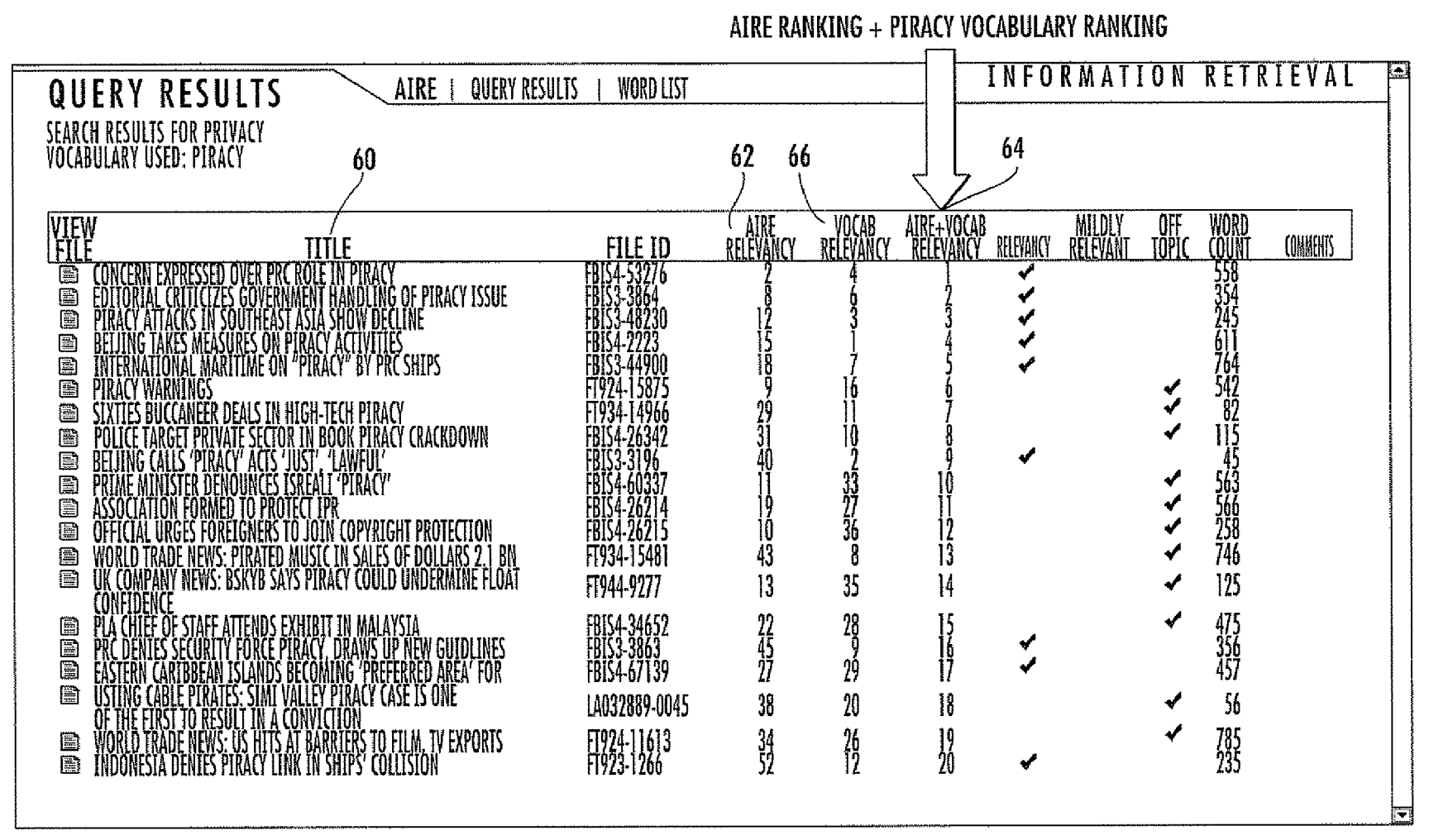

Combining the AIRE ranking and the "piracy" vocabulary ranking to obtain a new ranking from 1 to 20 (column 64) is provided in column 60 in FIG. 9. In lieu of creating a new vocabulary as discussed above, an existing vocabulary may be used. For example, the results of a predefined "maritime" vocabulary have now been combined with the AIRE results. The documents ranked from 1 to 20 (column 64) corresponding to this re-ranking are listed in column 60 in FIG. 10. As yet another comparison, the document titles corresponding to only the "maritime" vocabulary rankings from 1 to 20 (column 66) are listed in column 60 in FIG. 11. A visual comparison can again be made between the relationships in the ranked baseline documents provided by AIRE in FIG. 4 versus the ranked documents provided by the most relevant "maritime" vocabulary words in FIG. 11.

The results of the various approaches just discussed for re-ranking the retrieved documents will now be discussed with reference to FIG. 12. This discussion is based upon the number of relevant documents in the top 5, 10, 15, 20 and 30 ranked or re-ranked documents. The first set of bar graphs correspond to the baseline AIRE rankings provided in columns 60 and 62 in FIG. 4. In the 5 top ranked documents there was 1 relevant document; in the 10 top ranked documents there were 2 relevant documents; in the 15 top ranked documents there were 4 relevant documents; in the 20 top ranked documents there were 5 relevant documents, and in the 30 top ranked documents there were 6 relevant documents.

When the AIRE ranking was combined with the "piracy" vocabulary ranking as provided in columns 60, 64 in FIG. 9 there was a decrease in the number of relevant documents in the re-ranked documents, as illustrated by the second set of bar graphs. In contrast, the number of relevant documents increases when the AIRE ranking and the "piracy" vocabulary ranking using the identification of irrelevant words are combined, as illustrated by the third set of bar graphs.

The fourth set of bar graphs is based upon a combined ranking of the AIRE ranking and the "maritime" vocabulary ranking as provided in columns 60, 64 in FIG. 10. Here, there is a greater increase in the number of relevant documents in the re-ranked documents.

Figure 11:
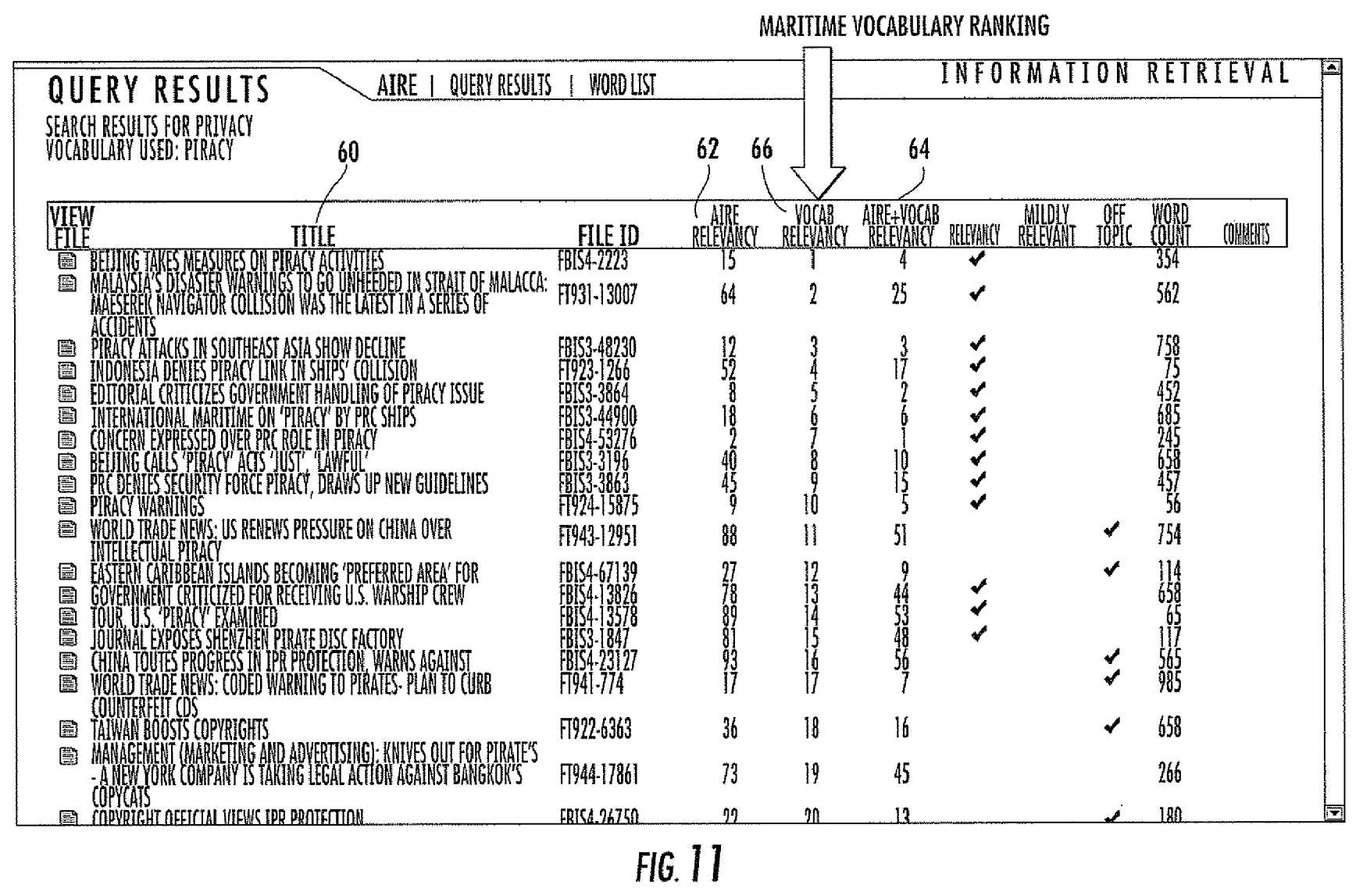

A further increase in the number of relevant documents in the re-ranked documents is based upon just the "maritime" vocabulary as provided in columns 60, 66 in FIG. 11. In the 5 top ranked documents there were 5 relevant documents; in the 10 top ranked documents there were 10 relevant documents; in the 15 and 20 top ranked documents there were 12 relevant documents for each; and in the 30 top ranked documents there were 13 relevant documents.

Figure 12:
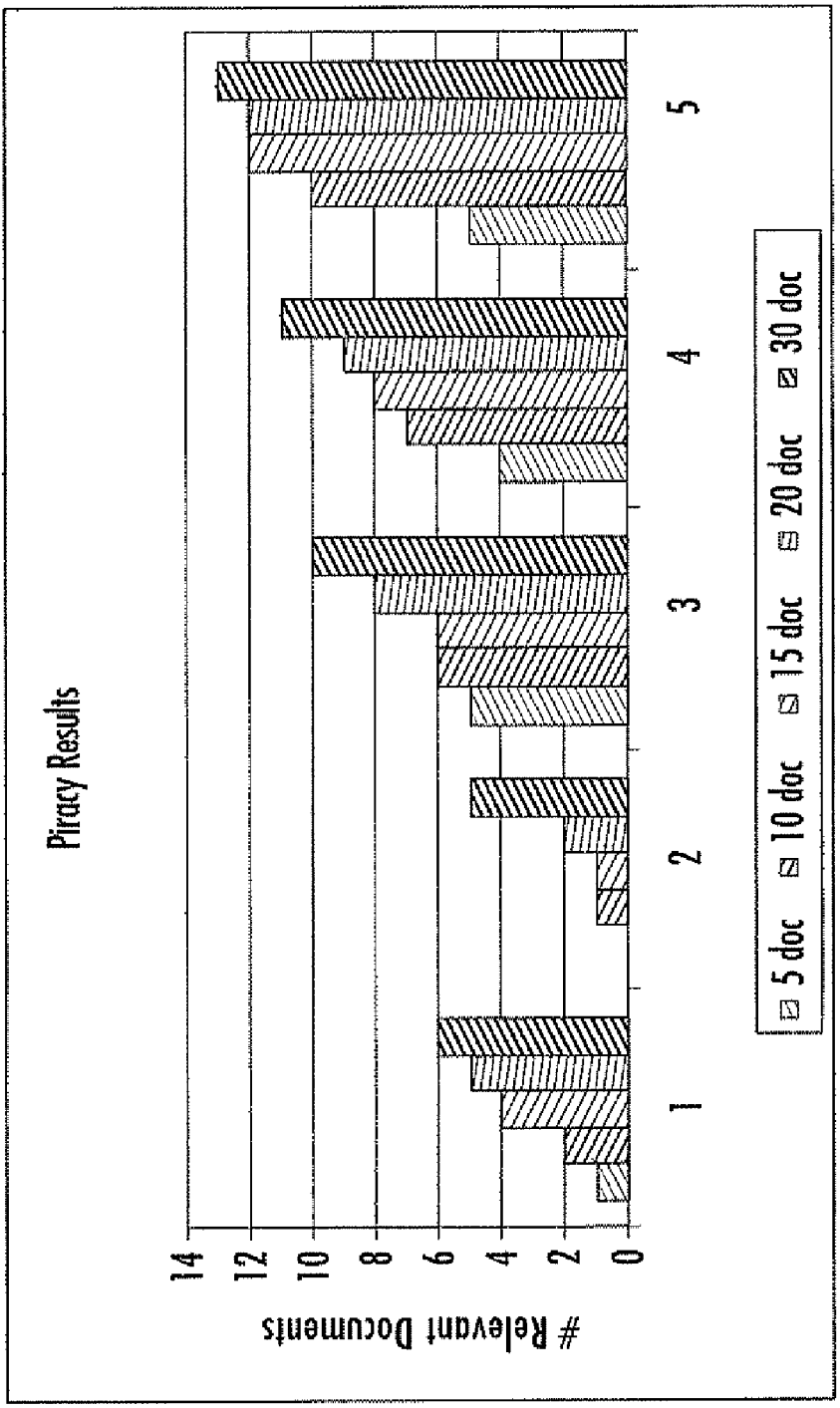
FIG. 12 is bar graph illustrating the number of relevant documents in the retrieved documents provided by different ranking parameters in accordance with the present invention.

As best illustrated in FIG. 12, the present invention advantageously allows the user to re-rank the retrieved documents from a document database so that more of the top ranked documents are relevant documents. A vocabulary is built based upon the user search query, or an existing vocabulary is selected. A newly created vocabulary is analyzed to identify the importance of specific words and to also identify problem words. Relevant/irrelevant words are identified through the user search query, applicable algorithms and via user input. In addition, based upon the relevancy of the words, relevant/irrelevant documents are identified. The irrelevant documents are moved to the bottom of the ranking.

Figure 13:
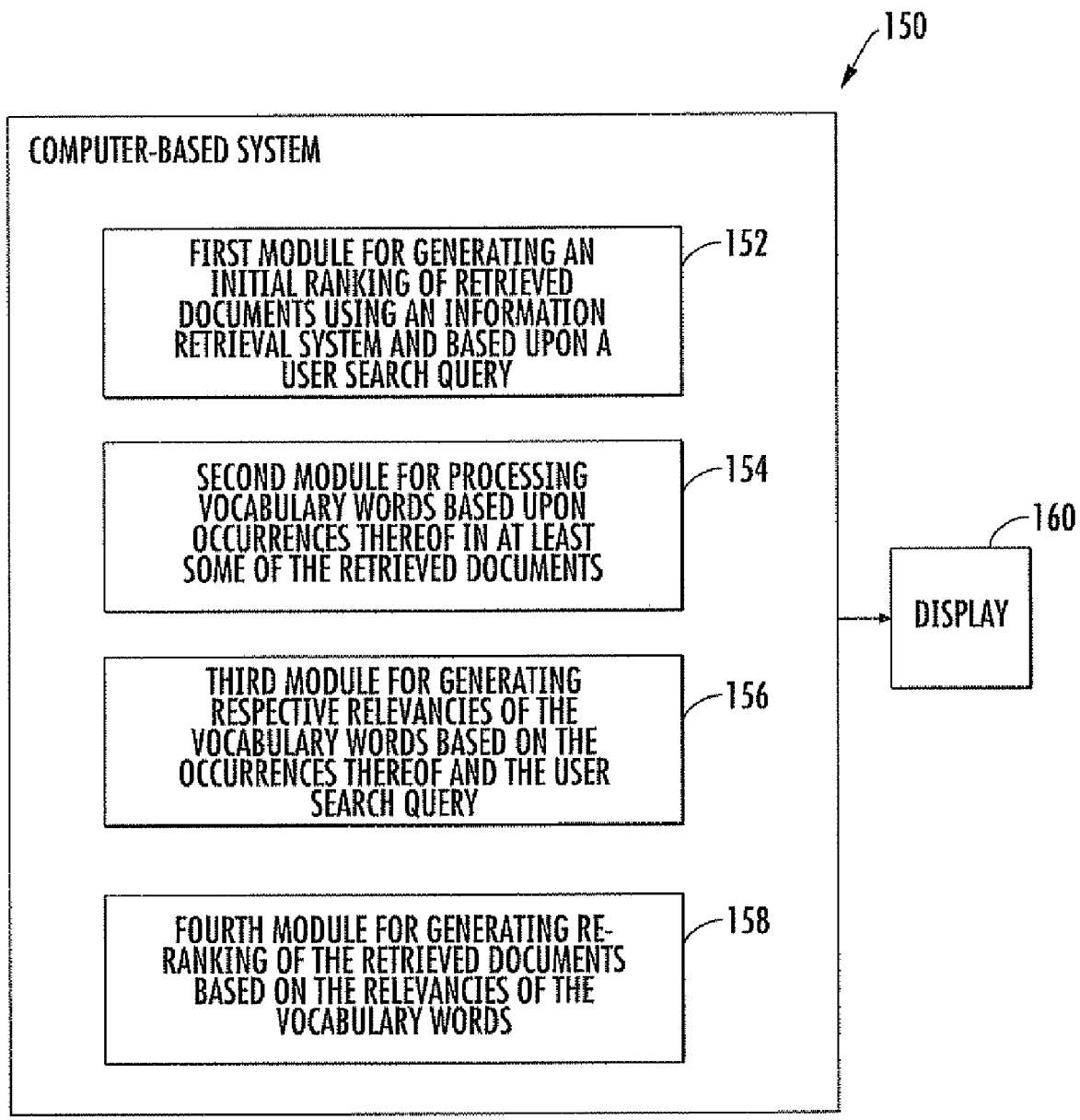
FIG. 13 is a block diagram of a computer-based system for processing documents in a document database in accordance with the present invention.

The method may be implemented in a computer-based system 150 for processing documents in a document database, as illustrated in FIG. 13. The computer-based system 150 comprises a plurality of first through fourth modules 152-158. The first module 152 generates an initial ranking of retrieved documents using an information retrieval system and based upon a user search query. The second module 154 generating a plurality of vocabulary words based upon occurrences thereof in at least some of the retrieved documents. The third module 156 generates respective relevancies of the vocabulary words based on the occurrences thereof and the user search query. The fourth module 158 generates a re-ranking of the retrieved documents based on the relevancies of the vocabulary words. A display 160 is connected to the computer-based system 150 for displaying the re-ranked documents.

The above described computer-implemented method for processing documents in a document database may also be applied to a multi-lingual document database. The multi-lingual documents may comprise at least one document having multiple languages and/or different documents with different languages.

Figure 14:
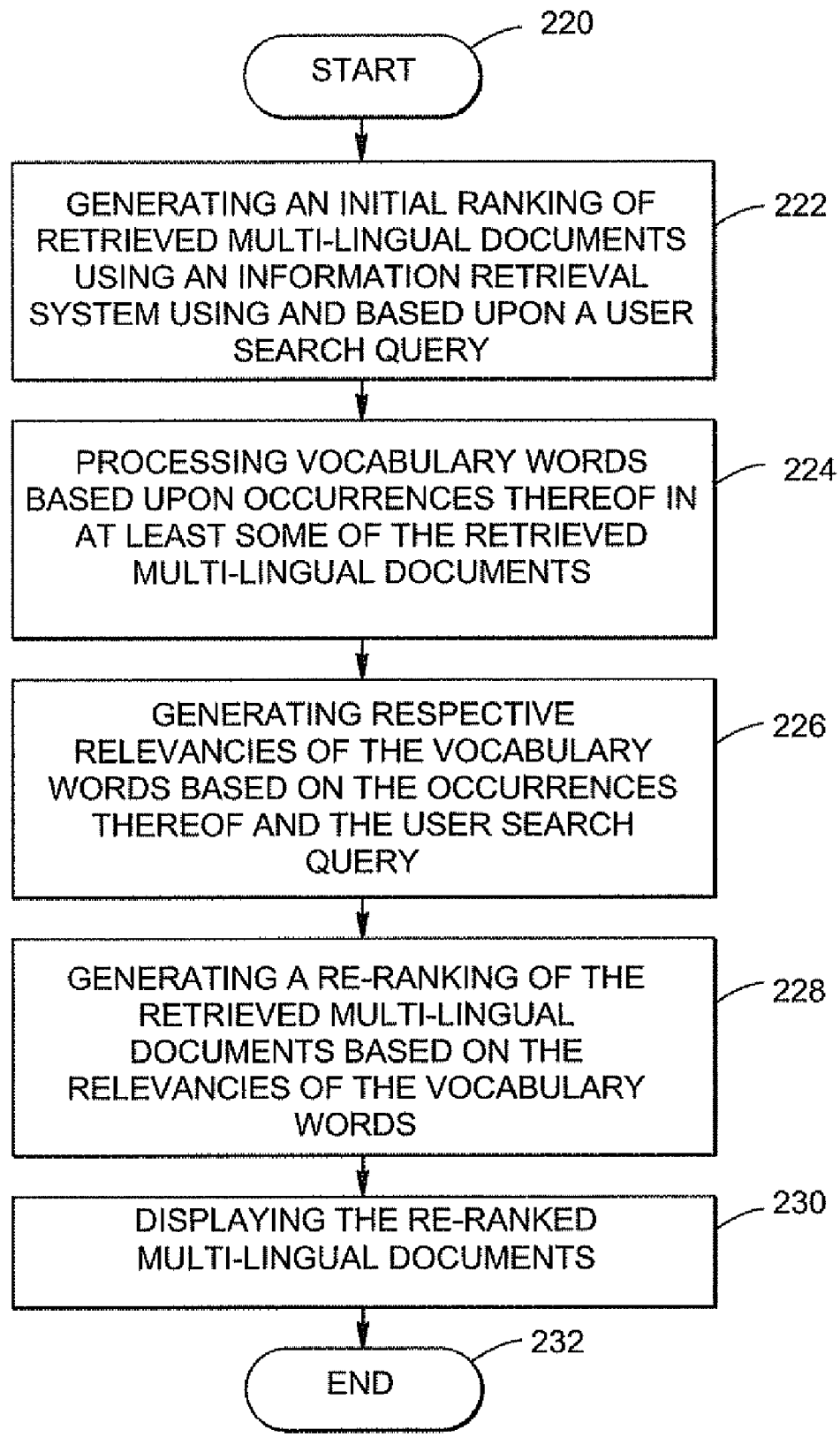
FIG. 14 is a flowchart for processing documents in a multi-lingual document database in accordance with the present invention.

Referring now to FIG. 14, a computer-implemented method for processing documents in a multi-lingual document database will be described. From the start (Block 220), the method comprises generating an initial ranking of retrieved multi-lingual documents using an information retrieval system and based upon a user search query at Block 222. A plurality of vocabulary words based upon occurrences thereof in at least some of the retrieved multi-lingual documents is generated at Block 224, and respective relevancies of the vocabulary words based on the occurrences thereof and the user search query is generated at Block 226. A re-ranking of the retrieved multi-lingual documents based on the relevancies of the vocabulary words is generated at Block 228. The method further comprises displaying the retrieved multi-lingual documents after having been re-ranked at Block 230. The method ends at Block 232.

The vocabularies are built by adding relevant multi-lingual documents to one or more vocabularies as they are identified. Domain vocabularies are created, maintained, and altered as needed, to capture the knowledge within a given area of interest. By sharing these vocabularies among the various users, the domain understanding of one user can be capitalized by other users. Linguists can use the domain expertise to accurately translate query terms to create a multi-lingual environment.

To better assist the user in identifying relevant documents containing multi-lingual information and discarding irrelevant documents after the documents have been retrieved using an information retrieval system, attention should be paid to word translations.

Depending on the language, word translations may be somewhat challenging. Many words may have multiple meanings, sentences may have multiple grammatical structures, there may be an uncertainty about what a pronoun refers to, and other grammar problems.

Translation is not strictly a linguistic operation. Also, translation is not an operation that always preserves intended meaning. For example, literally translating the phrase, "it's raining cats and dogs" is unlikely to capture and convey the intended meaning. To get an accurate translation the linguist should understand lexical semantics, compositional semantics and context. Lexical semantics deals with how each language provides words and idioms for fundamental concepts and ideas. Compositional semantics deals with how the parts of a sentence are integrated into the basis for understanding its meaning. Context deals with how our assessment of what someone means on a particular occasion depends not only on what is actually said, but also on aspects of the context of its saying and an assessment of the information and beliefs we share with the speaker.

A user search query can comprise a multi-lingual user search query, which may be defined by the user. Alternatively, a translator may be used to translate the words or terms in the user search query to a multi-lingual user search query.

As an example, the multi-lingual documents may be in English and Arabic. Arabic is used as an example language, whereas other languages may be used in lieu of or in addition to Arabic, such as French, Russian, Chinese and Korean. Since the processing of Arabic is of interest to the international community, it is included as an example language. Also, stemmers, indexers and translators are also available for Arabic.

However, the Arabic language orthography and morphology introduces a wide spectrum of lexical variations that are supported by the above-described computer-implemented method. For instance, non-vocalized orthography (e.g., newspaper articles) is often ambiguous, thus causing a mismatch with texts, dictionaries or queries that are vocalized. Further, any given word may be found in a large number of different forms. Thus, its likely position in a phrase, and its intended meaning will vary accordingly.

Also, the word structure in Arabic phrases and sentences is highly interdependent. The meaning of one word is dependent on the meaning of another word in the same phrase or in an adjacent phrase. Short vowels are frequently omitted in non-vocalized orthography assuming the reader will understand words based on the overall structure of the phrase or sentence. Knowledge of different dialects is also essential in Arabic, especially for written text of vocalized orthography.

Not all Arabic documents may be written in formal Arabic. An example is seen in the Aljazeera satellite channel where transcripts of different shows reflect the different backgrounds of guests. One of the differences between dialects and formal Arabic is that not all words can be traced back to root words, while in formal Arabic all words are traceable to a root word. Another problem to address is that with dialect words, prefixes and suffixes are applied differently. Some dialects are even unique by their own prefixes and suffixes.

Consequently, Arabic provides an excellent testing platform for the above-described computer-implemented method for processing documents in a multi-lingual document database. It is anticipated that the computer-implemented method for processing documents is word driven and not language driven.

As part of the basic concepts/architecture of a multi-lingual computer-implemented approach for processing documents, topic development allows an analyst to build their knowledge about the domain. The process starts by entering user search queries. The AIRE search engine returns a list of ranked results.

An algorithm re-ranks the results to bring the more relevant multi-lingual documents to the top of the list. The user can view the multi-lingual documents by examining the ranked results. As the analyst reviews the documents, they will identify relevant/irrelevant words and documents. The relevant documents can also be used to build the relevant vocabulary for the domain. Performing these tasks improves the query ranking and it records the domain expertise. This allows other analysts to use this expertise to query in the domain and get improved query results.

Sometimes, it may become necessary to translate topics into other languages to help identify documents relating to the target. A linguist using the present invention can quickly develop an understanding of the domain, which will help with the translation. The linguist can quickly review search terms, words and documents used to define the domain. To gain the proper word perspective the linguist can also review the documents associated with the dictionary and the documents identified as relevant/irrelevant.

As the linguist understands the appropriate usage of the word, they can add the translated term to the dictionary. However, the algorithms use the word count as part of the equations. It is important that the new word is linked to another word that has a specific word count. By linking words, the highest word count of the linked grouping will be used by the algorithms. This linking capability is not limited to just translation terms. It could also be used to link similar words, i.e., boat, ship, vessel, etc. If the translator identifies a new term that cannot be linked with an already existing word, they have the option of adding documents that contain the term, giving the word a word count.

Another multi-lingual scenario is the ability to merge different topics. Instead of performing translation on the terms, queries could be developed in the same domain in different languages and then merged together. The linguist may then decide to translate selected terms, as deemed necessary.

Another aspect of the present invention is directed to a computer-readable medium having stored thereon a data structure for processing documents in a multi-lingual document database as defined above.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A computer-implemented method for processing multi-lingual documents in a document database database using a computer-implemented system comprising a processor and a display operatively coupled to the processor, the method comprising:
    operating the processor to perform the following
        generating an initial ranking of retrieved multi-lingual documents using an information retrieval system and based upon a user search query provided by a user;
        displaying for the user the initial ranking of the retrieved multi-lingual documents;
        permitting user selection of a plurality of vocabulary words based upon occurrences thereof in at least some of the retrieved multi-lingual documents;
        generating respective relevancies of the user-selected vocabulary words in the retrieved multi-lingual documents;
        generating a re-ranking of the retrieved multi-lingual documents based on the generated respective relevancies of the vocabulary words; and
    operating the display to display for the user the re-ranking of the multi-lingual documents, and for each multi-lingual document being displayed, also to display its initial ranking.

2. A computer-implemented method according to claim 1 wherein the multi-lingual documents comprise at least one document having multiple languages.

3. A computer-implemented method according to claim 1 wherein the multilingual documents comprise different documents with different languages.

4. A computer-implemented method according to claim 1 wherein the user search query comprises a multi-lingual user search query.

5. A computer-implemented method according to claim 1 further comprising translating the user search query into a multi-lingual user search query before generating the initial ranking of the retrieved multi-lingual documents.

6. A computer-implemented method according to claim 1 further comprising generating the plurality of vocabulary words based upon occurrences thereof in at least some of the retrieved multi-lingual documents before generating the initial ranking of the retrieved documents.

7. A computer-implemented method according to claim 1 further comprising selecting a vocabulary comprising the plurality of vocabulary words before permitting user selection of the plurality of vocabulary.

8. A computer-implemented method according to claim 7 wherein the plurality of vocabulary words are based upon words in at least one predetermined document.

9. A computer-implemented method according to claim 8 wherein the at least one predetermined document is not part of the retrieved multi-lingual documents.

10. A computer-implemented method according to claim 7 further comprising adding vocabulary words to the vocabulary based upon occurrences of words in at least some of the retrieved multilingual documents.

11. A computer-implemented method according to claim 10 further comprising determining a quality of the vocabulary based upon how many vocabulary words are added thereto.

12. A computer-implemented method according to claim 1 further comprising selecting N top ranked documents from the retrieved multi-lingual documents before processing the plurality of vocabulary words, with N being an integer greater than 1; and wherein generating the respective relevancies and generating the re-ranking are with respect to the N top-ranked documents.

13. A computer-implemented method according to claim 12 wherein generating the respective relevancies of the vocabulary words comprises:
    counting how many times a respective, vocabulary word is used in the N top ranked documents; and
    counting how many of the N top ranked documents uses the respective vocabulary word.

14. A computer-implemented method according to claim 13 further comprising generating a word/document ratio for each respective vocabulary word based upon the counting, and if the word/document ratio is less than a threshold, then the relevancy of the word is not used when generating the re-ranking of the N top ranked documents.

15. A computer-implemented method according to claim 1 further comprising determining which documents from at least some of the retrieved multilingual documents are irrelevant to the user search query; and wherein generating the re-ranking of the retrieved multi-lingual documents is also based on the irrelevant documents.

16. A computer-implemented method according to claim 1 further comprising determining which documents from at least some of the retrieved multilingual documents are relevant to the user search query; and wherein generating the re-ranking of the retrieved multi-lingual documents is also based on the relevant documents.

17. A computer-implemented method according to claim 16 further comprising determining if the respective vocabulary words are relevant to the user search query; and wherein determining the relevant documents is based upon the relevant vocabulary words.

18. A computer-implemented method according to claim 1 further comprising determining a respective source of at least some of the retrieved multilingual documents, and assigning priority to documents provided by preferred sources; and wherein generating the re-ranking of the retrieved multi-lingual documents is also based on documents with preferred sources.

19. A computer-implemented method according to claim 1 further comprising generating a second re-ranking of the retrieved multi-lingual documents based upon a combination of the initial ranking and the re-ranking of the retrieved multi-lingual documents.

20. A computer-implemented method according to claim 1 further comprising displaying the re-ranked multi-lingual documents.

21. A computer-implemented method for processing multilingual documents in a document database using a computer-implemented system comprising a processor and a display operatively coupled to the processor, the multi-lingual documents having an initial ranking based upon a user search query provided by a user, the method comprising;
    operating the processor to perform the following
        selecting N top ranked multi-lingual documents from the retrieved multilingual documents, with N being an integer greater than 1;
        displaying for the user the initial ranking of the N top ranked retrieved multi-lingual documents;

permitting user selection of a plurality of vocabulary words based upon occurrences thereof in at least some of the retrieved multi-lingual documents;

generating respective relevancies of the user-selected vocabulary words in the N top ranked retrieved multi-lingual documents;

generating a re-ranking of the N top ranked multi-lingual documents based on the relevancies of the vocabulary words; and operating the display to display for the user the re-ranking of the multi-lingual documents, and for each multi-lingual document being displayed, also to display its initial ranking.

22. A computer-implemented method according to claim 21 wherein the multilingual documents comprise at least one document having multiple languages.

23. A computer-implemented method according to claim 21 wherein the multi-lingual documents comprise different documents with different languages.

24. A computer-implemented method according to claim 21 wherein the user search query comprises a multi-lingual user search query.

25. A computer-implemented method according to claim 21 further comprising translating the user search query into a multi-lingual user search query before generating the initial ranking of the retrieved multi-lingual documents.

26. A computer-readable medium having stored thereon a data structure for processing documents in a multilingual document database, the computer-readable medium comprising:

a first data field for generating an initial ranking of retrieved multilingual documents using an information retrieval system and based upon a user search query provided by a user;

a second data field for displaying for the user the initial ranking of the retrieved multi-lingual documents;

a third data field for permitting user selection of a plurality of vocabulary words based upon occurrences thereof in at least some of the retrieved multilingual documents;

a fourth data field for generating respective relevancies of the user-selected vocabulary words;

a fifth data field for generating a re-ranking of the retrieved multilingual documents based on the generated respective relevancies of the vocabulary words; and a sixth data field for displaying for the user the re-ranking of the multi-lingual documents, and for each multi-lingual document being displayed, also displaying its initial ranking.

27. A computer-readable medium according to claim 26 wherein the multi-lingual documents comprise at least one document having multiple languages.

28. A computer-readable medium according to claim 26 wherein the multi-lingual documents comprise different documents with different languages.

29. A computer-readable medium according to claim 26 wherein the user search query comprises a multilingual user search query.

30. A computer-readable medium according to claim 26 further comprising a seventh data field for translating the user search query into a multi-lingual user search query before generating the initial ranking of the retrieved multilingual documents.

* * * * *